UNITED STATES PATENT OFFICE 2,393,825

POLYAMINES

Murray Senkus, Terre Haute, Ind., assignor to Commercial Solvents Corporation, Terre Haute, Ind., a corporation of Maryland No Drawing. Application August 24, 1942, Serial No. 455,932

7 Claims. (Cl. 260—583)

My invention relates to new and useful polyamines. More particularly, it is concerned with polyamines having the following structural formula:

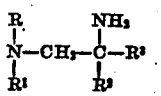

in which R represents either hydrogen, alkyl, or hydroxyalkyl; $R^1$ may be alkyl or hydroxyalkyl.

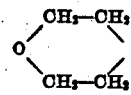

and $R^2$ and $R^3$ represent alkyl groups.

Polyamines of the above type are readily prepared from the corresponding nitroamines by subjecting the latter to catalytic liquid phase high pressure hydrogenation. In accordance with this procedure, the nitroamine, catalyst and a suitable solvent, such as methyl or ethyl alcohol, are introduced into a pressure hydrogenation apparatus of conventional design, such as that described at pages 29 to 45 in Adkins' treatise on "Reactions of Hydrogen" (University of Wisconsin Press, 1937), which comprises a cylindrical steel reaction vessel fitted with a flexible tubing for the introduction of hydrogen under pressure. The apparatus may be equipped with a suitable agitation means, and an electrical heating unit in order that the reduction may be effected under as widely varying conditions as are deemed necessary or desirable.

The catalyst utilized may be any of several hydrogenation catalysts which are active under the operation temperatures employed. A number of such hydrogenation catalysts are described in Ellis' book on "Hydrogenation of Organic Substances," 3rd ed. (1930). In the majority of instances, however, I have found that the well known Raney nickel catalyst usually gives the most satisfactory results. Numerous other hydrogenation catalysts are, nevertheless, quite satisfactory and will be found to be sufficiently active under the operating conditions employed to result in adequate yields of polyamines, which render the use of such catalysts practicable from an economical standpoint. For example, nickel precipitated from nickel carbonate, and supported on infusorial earth (Covert et al., J. Amer. Chem. Soc. 54, 1651 (1932)), or catalysts of nickel on silica gel (Holmes and Anderson, Ind. & Eng. Chem. 17, 280 (1925)), may also be employed. These catalysts are most active at temperatures above 80–85° C., however, and are less desirable for hydrogenation reactions occurring at lower temperatures. In general, it will be found preferable to utilize catalysts that are active at lower temperatures, due to the tendency of the nitroamines to decompose under conditions of elevated temperature and pressure.

Hydrogen is introduced into the apparatus in a manner such that the pressure exerted thereby will vary from approximately 300 to over 2000 pounds per square inch. In general, however, I prefer to use pressures ranging from between about 500 to 1000 pounds per square inch, but it is to be understood that other hydrogen pressures may be employed, their values generally being determined by the temperature used. The hydrogenation is preferably carried out at temperatures ranging from between about 30° and 50° C., with constant agitation for a period of from one to four hours. Temperatures of from 100° to 125° C., may nevertheless be utilized provided adequate precautions are taken with respect to the hydrogen pressure used. Ordinarily, optimum conditions in regard to time of reaction, temperature, pressure, and catalyst in any given instance, may readily be determined by simple experiment.

When the reduction is complete, the reaction mixture is removed from the apparatus, and the catalyst separated by filtration or other suitable means. The resulting filtrate is then distilled at atmospheric pressure to remove the solvents, after which a liquid, such as benzene or toluene, is added to the still residue for the purpose of removing the water formed during the reduction of the nitro compound. After all of the water is removed in this manner, the crude polyamine, if a liquid, is purified by rectification at atmospheric pressure or under vacuum, or by recrystallization from a suitable solvent, if it happens to be a solid under ordinary conditions.

The nitroamines employed as starting materials for the preparation of the polyamines of my invention, may be synthesized in accordance with the procedure described in my copending application, U. S. Serial No. 455,931, filed August 24, 1942. By this procedure, a primary or secondary aliphatic amine is reacted with formaldehyde to form the corresponding N-hydroxymethyl, mono-, or dialkylamine, which is in turn reacted with an equimolecular quantity of a secondary nitroparaffin to produce the desired nitroamine. The preparation of such nitroamines is preferably carried out at temperatures of from between about 25°–30° C. Temperatures above this range may be used, but in doing so, care should be exercised to avoid temperatures which cause the formaldehyde to be volatilized from the reaction mixture.

Although it may generally be desirable to reduce the substantially pure nitroamines, I have observed that highly satisfactory and frequently equally as good results are obtained by subjecting the entire reaction mixture, containing the crude nitroamine, to reduction in the presence of a suitable catalyst and solvent, as described above.

My invention may be further illustrated by the following specific examples:

EXAMPLE I

One hundred parts of N-(2-nitro-2-methylbutyl)-isopropylamine was mixed with 100 parts of methyl alcohol and 5 parts of Raney nickel catalyst, after which the resulting mixture was introduced into a suitable hydrogenation apparatus, and sealed. Hydrogen was then added at a pressure of 500 pounds per square inch, and at a temperature of 35° C. After the absorption of hydrogen ceased, the solution was removed from the apparatus, filtered, and the filtrate distilled at atmospheric pressure in order to remove the methyl alcohol therefrom. Two hundred parts of benzene was then added to the still residue, and the water, produced from the reduction of the nitro compound to the corresponding amine, was removed as a constant boiling mixture with benzene, the latter being returned to the still until substantially all of the water had been separated from the crude polyamine. The residue was then distilled under reduced pressure, and the fraction boiling at 57.5° C. (10 mm.) collected. The quantity of N-(2-amino-2-methylbutyl)-isopropylamine, recovered at this temperature, amounted to a conversion of 95 per cent.

EXAMPLE II

One hundred parts of N-(2-nitro-2-methylbutyl)-dimethylamine was dissolved in 150 parts of methyl alcohol. This solution was then introduced into a hydrogenation apparatus, together with 5 parts of Raney nickel catalyst. Reduction of the nitro compound was then effected at a temperature of about 45° C., and under a hydrogen pressure of approximately 550 pounds per square inch. Upon completion of the reaction, the crude mixture was treated in accordance with the process described in Example I. The N-(2-aminomethylbutyl) dimethylamine, thus obtained, amounted to a conversion of 86 per cent, based upon the weight of the corresponding nitroamine used.

The following data were determined for certain of the polyamines prepared in accordance with the procedure outline above:

Table

| Compound | Nitrogen analysis | | Boiling point, °C. | $n_D^{20}$ | $d_{20}^{20}$ | Conversion, percent |
| --- | --- | --- | --- | --- | --- | --- |
| | Calc'd., percent | Found, percent | | | | |
| N-(2-aminoisobutyl) methylamine | 27.45 | 27.38 | 123 (750 mm.) | 1.4293 | 0.8149 | [1] 80 |
| N-(2-aminoisobutyl) isopropylamine | 21.54 | 22.06 | 147.3 (760 mm.) | 1.4263 | 0.8025 | [1] 86 |
| N-(2-aminoisobutyl) butylamine | 19.44 | 19.23 | 64-66 (10 mm.) | 1.4346 | 0.8154 | [1] 90 |
| N-(2-aminoisobutyl)-1-methylpropylamine | 19.44 | 19.41 | 56-58 (10 mm.) | 1.4297 | 0.8171 | [2] 55 |
| N-(2-amino-2-methylbutyl) isopropylamine | 19.44 | 19.23 | 57.5 (10 mm.) | 1.4348 | 0.8166 | [2] 95 |
| N-(2-aminoisobutyl)-1-methylheptylamine | 14.00 | 14.05 | 74-75 (0.5 mm.) | 1.4417 | 0.8176 | [1] 77 |
| N-(2-aminoisobutyl)-2-ethylhexylamine | 14.00 | 13.87 | 70-73 (1 mm.) | 1.4444 | 0.8256 | [2] 81 |
| N-(2-aminoisobutyl)-octadecylamine | 8.24 | 8.04 | 45.4 [3] | | | [2] 96 |
| N-(2-aminoisobutyl) cyclohexylamine | 16.45 | 16.42 | 80 (3.5 mm.) | 1.4663 | 0.8857 | [1] 77 |
| N-(2-aminoisobutyl)-1-methylcylohexylamine | 15.21 | 15.22 | 85 (3.5 mm.) | 1.4659 | 0.8842 | [2] 76 |
| 5-amino-2,2,5-trimethyl-3-aza-1-hexanol | 17.50 | 17.29 | 115-116 (10 mm.) | 1.4651 | 0.9360 | [2] 55 |
| 5-amino-2-ethyl-5-methyl-3-aza-1-hexanol | 17.50 | 17.05 | 118-121 (10 mm.) | 1.4631 | 0.9343 | [1] 75 |
| N-(2-aminoisobutyl) dimethylamine | 24.12 | 23.83 | 119 (755 mm.) | 1.4216 | 0.7882 | [1] 66 |
| N-(2-amino-2-methylbutyl) dimethylamine | 21.53 | 21.57 | 146 (758 mm.) | 1.4318 | 0.8076 | [1] 86 |
| N-(2-aminoisobutyl) dibutylamine | 14.00 | 13.99 | 89-90 (6 mm.) | 1.4412 | 0.8164 | [1] 60 |
| N-(2-aminoisobutyl) bis-2-ethylhexylamine | 8.97 | 8.90 | 141-143 (2 mm.) | 1.4547 | 0.8346 | [2] 70 |
| 3-(2-aminoisobutyl) 3-aza-1,5-pentanediol | 15.90 | 15.86 | 140 (1 mm.) | 1.4888 | 0.0338 | [2] 25 |

[1] Polyamine was prepared from pure nitroamine.
[2] Polyamine was prepared from crude nitroamine; conversion is based on starting nitroparaffin.
[3] Melting point.

The polyamines of the above-mentioned type are generally either colorless liquids or white solids. These amines are, as a rule, insoluble in water, but are soluble in the lower aliphatic alcohols, ether, and benzene. The lower molecular weight polyamines possess a strong ammoniacal odor, the intensity of which decreases with an increase in the molecular weight of the polyamine. The majority of these amines tend to decompose on distillation at atmospheric pressure.

The polyamines of my invention have been found to be useful in certain instances as intermediates for the preparation of surface active agents. They are likewise useful as intermediates in the preparation of numerous other valuable organic compounds and compositions. Additional uses of these products will readily occur to those skilled in the art.

My invention now having been described, what I claim is:

1. N-(2-amino-2-methylbutyl) isopropylamine having the structural formula:

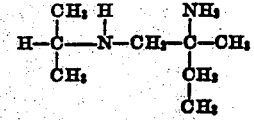

2. N-(2-amino-2-methylbutyl) dimethylamine having the structural formula:

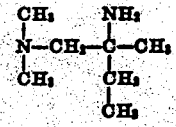

3. Polyamines of the formula

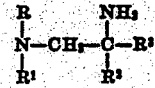

wherein R is a member selected from the group consisting of hydrogen, alkyl, and hydroxyalkyl, R¹ is a member selected from the group consisting of alkyl and hydroxyalkyl, and R² and R³ represent alkyl groups.

4. In a process for the production of polyamines of the formula

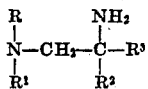

wherein R is a member selected from the group consisting of hydrogen, alkyl, and hydroxyalkyl, $R^1$ is a member selected from the group consisting of alkyl and hydroxyalkyl, and $R^2$ and $R^3$ represent alkyl groups, the step which comprises subjecting the corresponding nitroamines to hydrogenation in the liquid phase in the presence of a nickel hydrogenation catalyst at a temperature not substantially in excess of 125° C.

5. In a process for the production of polyamines of the formula

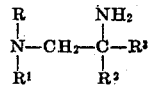

wherein R is a member selected from the group consisting of hydrogen, alkyl, and hydroxyalkyl, $R^1$ is a member selected from the group consisting of alkyl and hydroxyalkyl, and $R^2$ and $R^3$ represent alkyl groups, the step which comprises subjecting the corresponding nitroamines to hydrogenation in the liquid phase in the presence of a nickel hydrogenation catalyst at a temperature of between about 30° C. and 50° C.

6. In a process for preparing N-(2-amino-2-methylbutyl)isopropylamine, the step which comprises subjecting N-(2-nitro-2-methylbutyl)-isopropylamine to hydrogenation in the liquid phase in the presence of a nickel hydrogenation catalyst at a temperature not substantially in excess of 125° C.

7. In a process for preparing N-(2-amino-2-methylbutyl)dimethylamine, the step which comprises subjecting N-(2-nitro-2-methylbutyl)dimethylamine to hydrogenation in the liquid phase in the presence of a nickel hydrogenation catalyst at a temperature not substantially in excess of 125° C.

MURRAY SENKUS.